A. D. RAY.
LUBRICATOR BEARING.
APPLICATION FILED MAY 3, 1913.
1,103,432.
Patented July 14, 1914.
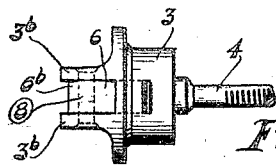
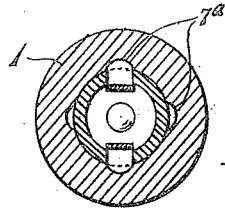
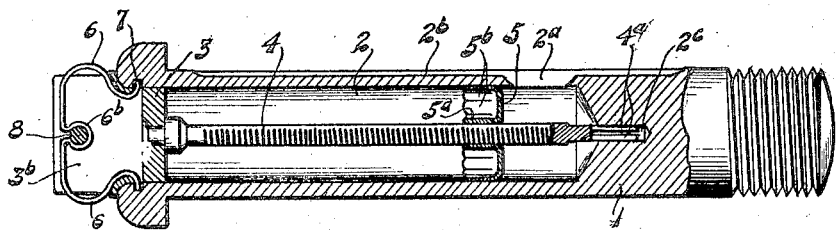
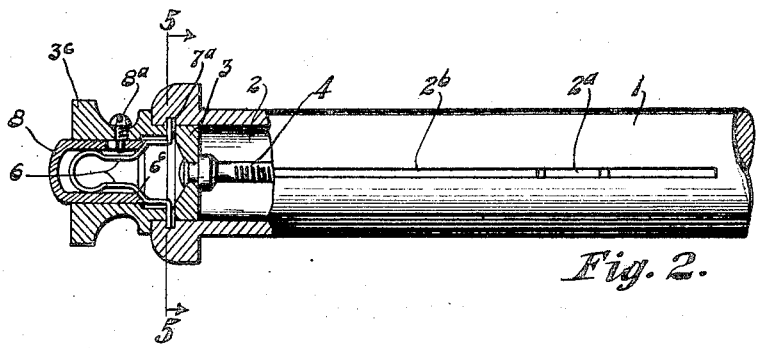
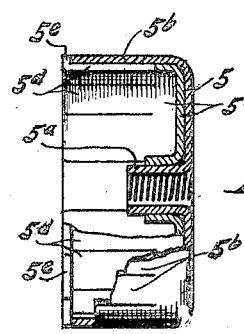
Witnesses
Jos. J. Hosler.
Chas. N. Russell
Inventor
Albert D. Ray
By Fred G. Dillman
Attorney

UNITED STATES PATENT OFFICE.

ALBERT D. RAY, OF CLEVELAND, OHIO, ASSIGNOR OF ONE-HALF TO CLYDE H. PRATT, OF CLEVELAND, OHIO.

LUBRICATOR-BEARING.

1,103,432.

Specification of Letters Patent. Patented July 14, 1914.

Application filed May 3, 1913. Serial No. 765,281.

*To all whom it may concern:*

Be it known that I, ALBERT D. RAY, a citizen of the United States, residing at Cleveland, in the county of Cuyahoga and State of Ohio, have invented certain new and useful Improvements in Lubricator-Bearings, of which the following is a specification.

My invention relates to improvements in lubricator bearings for use in connection with vehicles, machinery, etc., where it is desired to lubricate the bearings such as spring and shackle bolts, used in connection with automobiles or similar vehicles, or the axle or spindle bearings of wheels, and other moving parts, by the application of oil or grease for the purpose of preventing friction, wear, and the like.

The present embodiment is in the form of a spring or shackle bolt frequently used in forming the bearing or connection between the springs and the side bars or members of automobile vehicle frames.

The primary object of the invention is to provide a generally improved lubricator bearing of this class, of exceedingly simple, cheap, and efficient construction, and particularly to eliminate the usual separately formed and attached grease-cup by the provision of a lubricant or grease-containing chamber or receptacle within the bearing member or bolt, together with novel mechanism for feeding the lubricant from the lubricant or grease-containing receptacle or chamber to the friction bearing portions or surfaces of the bearing, as desired.

A still further object is to improve the construction and arrangement of the head-cap or closure for the lubricant or grease-containing chamber or receptacle and the means for attaching said head-cap or closure to or detaching the same from the bearing member or bolt.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1 is a longitudinal sectional view of the improved lubricator as applied to or embodied in an ordinary spring or shackle bolt. Fig. 2 a view, partly in plan and partly in section, of a modified form of same. Fig. 3, a view, partly in elevation and partly in section, of a modified form of piston or plunger for use in the lubricant chamber or receptacle. Fig. 4 a side view of the form of the head-cap or end closure shown in Fig. 1, detached. Fig. 5 a sectional view taken on line 5—5 of Fig. 2.

Similar numerals of reference designate like parts throughout all the figures of the drawings.

The improved lubricator comprises a bearing or pin member 1, consisting, in the present embodiment, of a bearing or connecting bolt 1 for forming the bearing or connection between the spring or shackle members and the side bars or members of automobile vehicle frames.

The bearing or bolt member 1 is provided with a longitudinally extending bore or lubricant receiving and containing chamber or receptacle 2, said bore or chamber 2 extending from one end of the bearing or bolt and terminating near its inner end in an outlet slot or opening $2^a$, the latter communicating with a longitudinally extending lubricant distributing groove or channel $2^b$ on the exterior or bearing portion of the bearing or bolt member 1.

As a means for opening and closing the lubricant chamber or receptacle 2, as well as feeding the lubricant from the latter through the medium of the plunger member hereinafter described, a head-cap or closure 3 is detachably mounted at one end of the bearing or bolt member, said head-cap or closure being provided with a plunger-actuating stem 4 removably mounted within and passing through the plunger or piston member 5 within the chamber or receptacle 2. The inner end of the bore or chamber 2 preferably terminates in a bearing opening $2^c$ adapted to receive and contain the inner or bearing end $4^a$ of the plunger-actuating stem, said bearing portion $4^a$ being preferably split to frictionally engage the bearing opening $2^c$, as shown most clearly in Fig. 1 of the drawing.

As a means for causing the plunger member 5 to be moved to and fro within the chamber or receptacle 2 by manual rotation of the head-cap 3 and plunger-stem 4, the latter is preferably threaded, as shown in Figs. 1, 2 and 4, said threaded portion passing through an interiorly threaded opening or sleeve 5ª of the plunger, the latter being preferably provided with circumferentially extending split wings 5ᵇ adapted to frictionally engage within the walls of the chamber or receptacle 2 and prevent circumferential movement or rotation of the plunger member 5 as the plunger actuating stem 4 is rotated.

As a means for detachably mounting the head-cap or closure 3 in its closed or operative position, as well as resiliently holding said head-cap or closure in its respective adjusted positions, so as to prevent accidental circumferential movement of the same, said head-cap is provided with a pair of spring members, 6, adapted to take into and engage a circumferentially extending groove 7 within the mouth of the lubricant receiving chamber or receptacle 2, said circumferential groove 7 being provided at suitable intervals with notches or recesses 7ª into which the free ends of the spring member 6 are adapted to fit or be seated to prevent accidental or undesirable circumferential movement of the head-cap 3 and actuating stem 4 by jars, vibrations, or the like.

The spring member 6 may be formed from a single length or strip of material bent into loop form and detachably mounted in the head-cap 3, as shown in Figs. 1, 2, 4 and 5 of the drawings, and as shown in Figs. 1 and 4, the spring members 6 are detachably mounted through the medium of an intermediate loop portion 6ᵇ mounted on a pin or cross member 8 extending between thumb wings 3ᵇ of the head-cap, and when it is desired to detach and remove the head-cap or closure 3 together with the plunger actuating stem 4 and plunger member 5 carried by the latter, the projecting portions and the spring member 6 may be pressed toward each other, thereby detaching or disengaging the free ends of the spring member 6 from the groove 7 or recess 7ª.

If desired, the head-cap 3 may be provided with a milled or knurled head 3ᶜ, as shown in Fig. 2 of the drawings, in which instance the head-cap is provided with a detachably mounted longitudinally movable U-shaped member 8 held in and adapted to have a limited movement within the head-cap by means of a retaining screw 8ª, the inner ends of the U-shaped member 8 being beveled and being adapted to coöperate with the inclined or beveled portions 6ᶜ of the springs 6, it being obvious that an inward pressure of the U-shaped member 8 will move the spring members 6 toward each other, and thus release the latter from the groove 7 or recess 7ª.

In Fig. 3 of the drawings, I have shown a modified form of plunger comprising a double-walled plunger in which an inner member or cap 5ᶜ is provided, the split wings 5ᵈ of said inner member being arranged in overlapping or staggered relation to the outer wing members 5ᵇ and terminating in an outwardly extending flange 5ᵉ fitting or abutting against the ends of the outer wings 5ᵇ, and extending flush with the outer periphery of said wings.

From the foregoing description, taken in connection with the accompanying drawings, the operation and advantages of my invention will be readily understood.

Having thus described some of the embodiments of my invention, what I claim and desire to secure by Letters Patent is,—

1. A lubricator bearing, comprising a chambered bearing member having an exterior communicating lubricator distributing groove, a threaded plunger provided with circumferentially extending split wings adapted to prevent rotation, a rotatable head-cap carrying a threaded stem adapted to rotate therewith and extending through said threaded plunger, and means for detachably securing said head-cap and normally preventing the circumferential movement of the same.

2. In a lubricator bearing, a headed bearing bolt provided with a cylindrical bore extending from said headed end and terminating in a bearing opening and a lubricant outlet port, said headed end being provided with a circumferential groove at the mouth of said bore, a threaded plunger member, a rotatable head-cap provided with a threaded stem extending through said threaded plunger and having its inner end split and removably mounted in said bearing opening, and a spring loop member having its free ends normally traversing said groove for detachably connecting said rotatable head-cap to said bearing bolt and resiliently preventing the rotation of said head cap in the latter.

3. A lubricator, comprising a bearing member having a cylindrical bore extending from one end and terminating in a lubricant outlet opening, said cylindrical bore being provided at its mouth with a circumferentially extending groove having recesses, a threaded non-rotatable plunger member provided with split wings, a rotatable head-cap provided with a fixed threaded stem extending through said threaded plunger member, and spring members carried by said head-cap and adapted to interlock with and traverse said groove and recesses.

4. In a lubricator bearing, a bearing bolt provided with a cylindrical bore terminating at its mouth in a circumferentially extending groove, the latter being provided at intervals with radially extending recesses, said bore terminating at its opposite or inner end in a bearing opening and a lubricant outlet port, a threaded plunger member, a rotatable head-cap carrying a threaded stem extending through said threaded plunger and having its inner end seated in said bearing opening, a pair of spring members carried by said head-cap and adapted to traverse said groove and radially extending recesses.

In testimony whereof I have affixed my signature in presence of two witnesses.

ALBERT D. RAY.

Witnesses:
 O. C. BILLMAN,
 P. P. REAMER.